US008873201B2

United States Patent
Benakli et al.

(10) Patent No.: US 8,873,201 B2
(45) Date of Patent: Oct. 28, 2014

(54) LOW-RECESS WRITE POLE COIL NEAR SHIELD AT MEDIA-FACING SURFACE

(71) Applicant: Seagate Technology LLC, Cupertino, CA (US)

(72) Inventors: Mourad Benakli, Eden Prairie, MN (US); Kirill Aleksandrovich Rivkin, Edina, MN (US); Zhe Shen, Lakeville, MN (US); Jiaoming Qiu, Maple Grove, MN (US); Huaqing Yin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/961,672

(22) Filed: Aug. 7, 2013

(65) Prior Publication Data

US 2013/0321955 A1 Dec. 5, 2013

Related U.S. Application Data

(63) Continuation-in-part of application No. 13/365,942, filed on Feb. 3, 2012, now Pat. No. 8,804,280.

(51) Int. Cl.
| G11B 5/11 | (2006.01) |
| G11B 5/012 | (2006.01) |
| G11B 5/31 | (2006.01) |
| G11B 5/09 | (2006.01) |

(52) U.S. Cl.
CPC *G11B 5/11* (2013.01); *G11B 5/012* (2013.01); *G11B 5/312* (2013.01); *G11B 5/09* (2013.01); *G11B 5/315* (2013.01)

USPC .................................................. 360/235.4

(58) Field of Classification Search
CPC ........................................ G11B 5/11; G11B 5/10
USPC ............ 360/235.4, 234.3, 125.4, 110, 235.6, 360/235.5, 235.2, 235.7
See application file for complete search history.

(56) References Cited

U.S. PATENT DOCUMENTS

| 6,178,070 B1 * | 1/2001 | Hong et al. .................. 360/317 |
| 7,099,121 B2 | 8/2006 | Parker et al. |
| 7,149,055 B2 | 12/2006 | Clinton et al. |
| 7,212,367 B2 | 5/2007 | Clinton et al. |
| 7,362,530 B2 | 4/2008 | Hashizume |
| 7,372,665 B1 | 5/2008 | Stoev et al. |
| 7,440,213 B2 * | 10/2008 | Amin et al. ................... 360/66 |
| 7,468,862 B2 * | 12/2008 | Sasaki et al. ............. 360/125.02 |
| 7,679,863 B2 | 3/2010 | Hashimoto et al. |
| 7,808,746 B2 | 10/2010 | Burbank et al. |

(Continued)

OTHER PUBLICATIONS

U.S. Appl. No. 13/365,942, filed Feb. 3, 2012, Lopusnik et al.

(Continued)

*Primary Examiner* — Allen T Cao
(74) *Attorney, Agent, or Firm* — Hollingsworth Davis, LLC (57) ABSTRACT

An apparatus includes a write pole magnetically coupled to write coils that generate a first magnetic field during a switching event. The apparatus includes a shield at a media-facing surface and proximate the write pole. A conductive element is disposed proximate the shield and configured to generate a second magnetic field opposite to the first magnetic field during the switching event. A selected one of the write coils is located adjacent the shield separate from others of the write coils.

20 Claims, 5 Drawing Sheets

(56) References Cited

U.S. PATENT DOCUMENTS

| | | |
|---|---|---|
| 7,862,912 B2 | 1/2011 | Hellwig et al. |
| 7,869,309 B2 | 1/2011 | Mihalcea et al. |
| 8,077,417 B2 | 12/2011 | Mallary et al. |
| 8,107,180 B2 | 1/2012 | Nishida et al. |
| 8,289,821 B1 | 10/2012 | Huber |
| 8,363,346 B2 * | 1/2013 | Taguchi .......................... 360/75 |
| 2004/0169950 A1 | 9/2004 | Clinton et al. |
| 2005/0280935 A1 | 12/2005 | Clinton et al. |
| 2005/0289577 A1 | 12/2005 | Seigler et al. |
| 2006/0119982 A1 * | 6/2006 | Honjo et al. .................. 360/126 |
| 2006/0132971 A1 | 6/2006 | Clinton et al. |
| 2006/0176601 A1 * | 8/2006 | Amin et al. .................... 360/66 |
| 2007/0036040 A1 | 2/2007 | Mihalcea et al. |
| 2008/0088972 A1 * | 4/2008 | Sasaki et al. ................. 360/110 |
| 2008/0112087 A1 | 5/2008 | Clinton et al. |
| 2009/0128941 A1 * | 5/2009 | Taratorin ....................... 360/31 |
| 2009/0158305 A1 | 6/2009 | Seigler et al. |
| 2009/0226762 A1 | 9/2009 | Hellwig et al. |
| 2009/0237837 A1 | 9/2009 | Amin et al. |
| 2010/0149675 A1 | 6/2010 | Mallary et al. |
| 2011/0030109 A1 | 2/2011 | Saito |
| 2011/0242694 A1 | 10/2011 | Taguchi |
| 2012/0051196 A1 | 3/2012 | Grobis et al. |
| 2012/0229932 A1 * | 9/2012 | Sasaki et al. ............. 360/123.11 |
| 2012/0314325 A1 | 12/2012 | Wessel et al. |
| 2012/0327529 A1 | 12/2012 | Hutchinson et al. |

OTHER PUBLICATIONS

Aug. 7, 2013, File History for U.S. Appl. No. 13/365,942 as retrieved from the U.S. Patent and Trademark Office on Aug. 7, 2013, 96 pages.

* cited by examiner

LOW-RECESS WRITE POLE COIL NEAR SHIELD AT MEDIA-FACING SURFACE

RELATED PATENT DOCUMENTS

This application is a continuation-in-part of U.S. patent application Ser. No. 13/365,942, filed Feb. 3, 2012, which is hereby incorporated by reference in its entirety.

BACKGROUND

A magnetic recording medium stores data as regions of alternating magnetic orientation. In a hard disk drive, for example, data is written in circular tracks that include sequential changes in the direction of magnetization. The amount of data stored on a hard disk is generally determined by the areal density multiplied by the surface area of the magnetic disks available for data storage. Currently, hard disks come in a few standard form factors, and increases in total drive storage capacity have been made possible by continually increasing areal density of the magnetic disks.

SUMMARY

The present disclosure is related to magnetic write pole with low-recess coil near a shield at a media-facing surface. In one embodiment, an apparatus includes a write pole magnetically coupled to write coils that generate a first magnetic field during a switching event. The apparatus includes a shield at a media-facing surface and proximate the write pole. A conductive element is disposed proximate the shield and configured to generate a second magnetic field opposite to the first magnetic field during the switching event. A selected one of the write coils is located adjacent the shield separate from others of the write coils.

In another embodiment, a method involves sending a current to first coils of a write pole and also sending the current to a low-recess coil of the write pole. The low-recess coil is adjacent a shield at a media-facing surface and separate from first coils. The current generates a first magnetic field at the media-facing surface during a switching event. The method also involves generating a second magnetic field opposite to the first magnetic field at a shield during the switching event.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is generally related to an apparatus (e.g., a magnetic read/write head) having a magnetically activated shield that enhances a dynamic gradient of magnetic flux applied to a media via a write pole. Generally, the shield is activated by sending current to a wire (hereinafter referred to as "shield wire") that is placed inside or on top of the front shield. The current runs in the direction opposite to that of main coils that energize the write pole, the shield being energized at the same time or nearly so as the main coils. During switching of magnetic orientation, the shield wire magnetizes the front shield in the direction opposite to that of the main pole, enhancing the gradient during the transition.

It is usually expected that the main pole magnetizes the shields and therefore potential difference between the main pole and shields (and the resulting gradient) always lags. In certain cases the shield response lags behind the main pole dynamics, in which case dynamic front shield saturation is also observed and the front shield aligns in the same direction as the write pole during switching. If the shields are activated directly by shield wires, the gradient is enhanced before the main pole is fully magnetized (e.g., just when it starts to write to the media). In such a case, improved performance can be achieved, resulting in, increased areal data density. The shield wire also intended to prevent dynamic front shield saturation. There is evidence that design modifications consistent with larger field/gradient (e.g., large top bevel, sloped front shield, etc.) run a risk of increasing saturation of the shield, so that future implementation of this mitigation is warranted.

The physics of using the shield wire to improve the dynamic gradient has been verified experimentally. However, it was also found that the design may benefit from further changes. For example, additional wires in the shield area directly impact the write pole, reducing the magnetomotive force (MMF) the write pole experiences. The shield wire is located very close to pole at the media-facing surface, and in some cases slows down the write pole dynamic performance. Encasing significant portion of the wire in the front shield was meant to prevent such behavior.

Experiments have established, however, that even without any current applied to the write pole, the shield wire by itself is capable of writing through activating the write pole. Unexpectedly, even at relatively high wire currents, there was no clear evidence of front shield erasure. One of the possible explanations for this is that all but a central 0.7 um portion of the wire is located outside the front shield. However, the modeling seems to indicate that while this effect is substantial, it by no means dominating.

Even in configurations where the shield wire is completely inserted in the front shield, it appears that even a small current (10 mA or so) is enough to almost completely saturate a portion of the front shield. After that the wire field leaks directly into the write pole. Even though relative efficiency of such shield wire is smaller than even that of a single coil turn, it is enough to force operation at very high currents and overshoots, especially for high data rate performance, where rise time is important.

On the other hand, a number of solutions that allow greatly reduce rise time and improve the writer performance are associated with a substantially higher risk of front shield saturation and erasure. One efficient solution involves putting one of the writer coils (hereinafter also referred to as a "low-recess coil") close to the media-facing surface, e.g., within 1 μm. The low recess coil can be combined with a direct activation of the front shield by the shield wire, directly compensating for the latter's negative impact on write pole dynamics and efficiency.

The low-recess coil can be located on the leading or trailing edge of the writer. In order to be more efficient in driving the write pole than the wire, the low-recess coil may be located very close to the write pole at the media-facing surface. In order to not disturb the positive effect the shield wire field has on the front shield, the low-recess coil may be to be thin. The number of writer coils may be unbalanced on leading versus trailing sides to optimal writing angle, which also takes account the presence of the shield wire.

Figure 1:
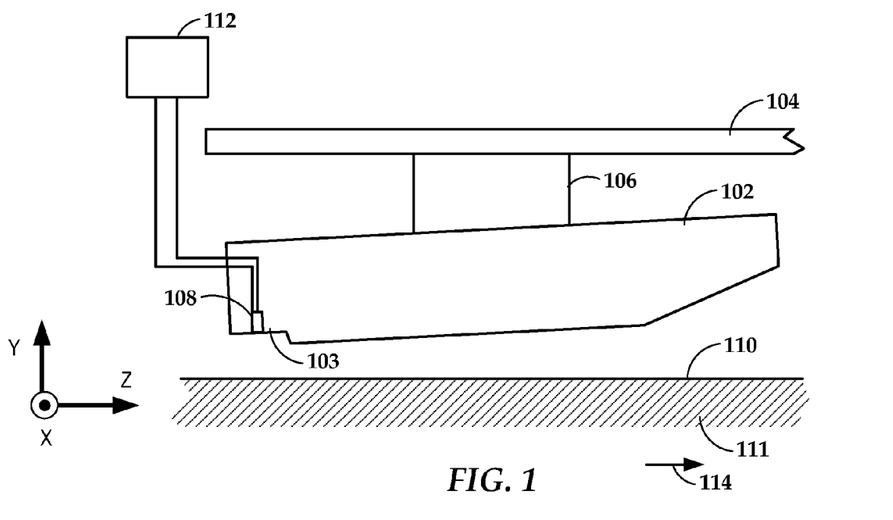
FIG. 1 is a side view of a slider assembly according to an example embodiment.

In reference now to FIG. 1, a block diagram shows a side view of a magnetic writer used in a slider 102 according to an example embodiment. This slider 102 may be used as a read/write head of a data storage device, e.g., hard drive. The slider 102 is coupled to an arm 104 by way of a suspension 106 that allows some relative motion between the slider 102 and arm 104. The slider 102 includes a write transducer 108 at a media-facing surface 103 (e.g., air bearing surface). The media-facing surface 103 is held proximate to a surface 110 of a magnetic recording media, e.g., magnetic disk 111 while reading from and writing to the disk 111.

A control circuit 112 is coupled to the write transducer 108. The control circuit 112 provides a signal that causes changes in a magnetic field of a write coil of the write transducer 108. The changing magnetic field results in local changes in magnetic orientation of the magnetic disk 111 as the disk 111 moves underneath the slider 102, as indicated by arrow 114. The arrow 114 generally indicates a down track direction of the slider. A direction normal to the page (x-axis) is a cross track direction, and the slider 102 is moved in the cross track direction by the arm 104 when seeking to different tracks.

The control circuit 112 may also send a current to a shield wire. This shield current may be in an opposite direction as the current sent to the write coils, which will induce a magnetic field that has an opposite orientation to that of the write coil. As will be described in greater detail below, the control circuit 112 (or other circuits) may cause a delay between transitions of the write coil current and the shield current. These delays may help increase write field during steady-state operations, while still enhancing magnetic gradient during transitions.

Figure 2:
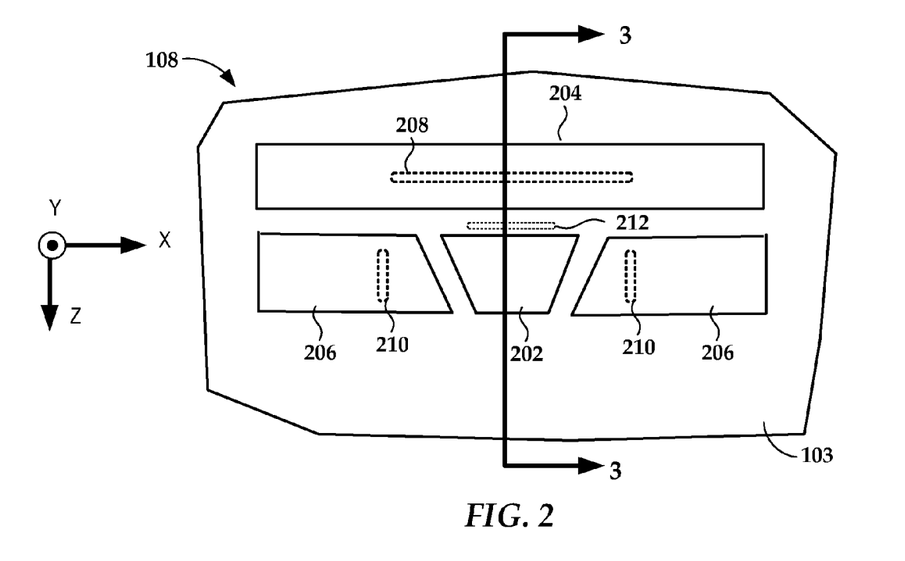
FIG. 2 is a plan view of a write transducer at a media-facing surface according to an example embodiment.

In reference now to FIG. 2, a plan view of the media-facing surface 103 shows details of a write transducer 108 according to an example embodiment. A write pole 202 is exposed at the media-facing surface 103. A front shield 204 is located in a down track direction (z-direction) relative to the write pole 202. The front shield 204 is a component that limits/shapes (in the down track direction) magnetic fields produced by the write pole 202. Similarly, side shields 206 limit/shape the magnetic fields of the write pole 202 in a cross track direction (x-direction). The write pole 202 and shields 204, 206 are generally made of ferromagnetic materials.

As previously noted above, a conductive element, e.g., shield wire 208, is located within or nearby to the front shield 204. During operation, the shield wire 208 is energized to create a magnetic field that is opposite of a magnetic field generated by the write pole 202. This may be done, for example, by running a current through the wire 208 in a direction opposite to that of the main write coil that magnetizes the write pole 202. By synchronizing opposing currents in this way, the front shield 204 can more quickly close the magnetic flux circuit during transitions and establish a sharper gradient. A similar effect may be induced by including shield wires 210 in one or more of the side shields 206, either instead of or in addition to the front shield wire 208.

As mentioned above, it has been found that the front shield wire 208 may magnetize the write pole 202 even at low currents through the shield wire 208. To prevent this magnetization, a selected one of the coil wires 212 is placed near the media-facing surface 103. As will be shown in other views, the selected coil wire 212 may be spaced apart (e.g., recessed) from the media-facing surface 103 so that it is near a top surface of the front shield 204. In this case, a "top" surface is a surface facing away from the media-facing surface 103. Based on this convention, the bottom the front shield 204 is the one visible in the plan view of FIG. 2.

Figure 3:
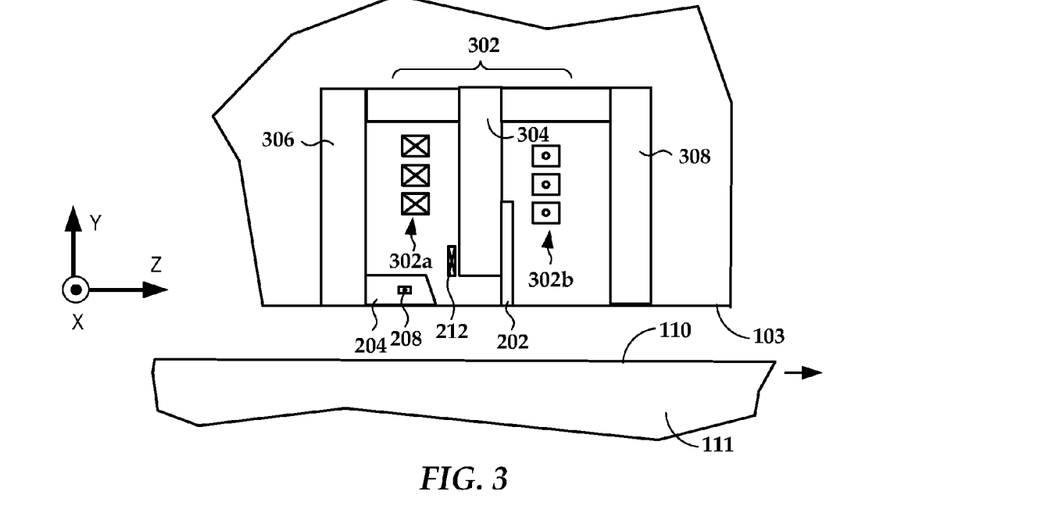
FIGS. 3-6 are cross-sectional views of write transducers according to example embodiments.

In FIG. 3, a cross-section view taken along section 3-3 in FIG. 2 illustrates additional details of a write transducer according to an example embodiment. The write transducer includes a coil 302 with coil wires 302a before/leading the write pole 202 and coil wires 302b after/trailing the write pole 202. As previously mention, a low-recess coil wire 212 is closer to the media-facing surface 103 than the other coil wires 302a, 302b. For current hard disk writing applications, the low-recess coil wire 212 may be 1 µm or less from the media-facing surface 103 (measured in the y-direction in FIG. 3). The low recess coil wire 212 may be separated from the other coil wires 302a, 302b in the y-direction by 300 nm or more.

The low-recess coil wire 212 is part of the coil 302, in that it induces the same magnetic field for a given current flow direction as the other coil wires 302a, 302b. The low-recess coil wire 212 may be directly electrically coupled to one or more of the wires 302a, 302b so that the current sent to the coils wires 302a, 302b also flows through the low-recess coil wire 212.

The coils wires 212, 302a, 302b surround a yoke 304 through which magnetic flux moves. The flux is directed to a front return pole 306 and a rear return pole 308, as well as the write pole 202. Generally, the media 111 has a structure that facilitates perpendicular orientation of recorded bits. The orientation of the write pole 202 and return poles 306, 308 cause the magnetic lines of flux to be oriented perpendicular to the recording surface when the coil 302 is energized.

In the embodiment shown in FIG. 3, the selected, low-recess write coil 212 is between the write pole 202 and the front shield 204. In this configuration, negative influence on front shield saturation can be substantial. In the illustrated example, the low-recess coil 212 activates at least portion of the front shield 204 in the correct direction, which is opposite to that of the main write pole 202, acting therefore in cohesion with the shield wire 408. At the same time, the low-recess coil 212 negates negative effects of the shield wire 408 on write pole dynamics.

It should be noted that a number of coils 302a, 212 on one side of the write pole 202 is different than a number of coils 302b another side of the write pole 202. This asymmetry may be a used to shape/influence the magnetic field of the write pole 202 in a leading or trailing direction. While this and other embodiments show a different number of coils on opposite sides of the write pole, it will be understood that the number of coils on either side of the write pole may be the same. For example, in FIG. 3, one of the write coils 302a may be removed to compensate for low-recess coil 212.

Figure 4:
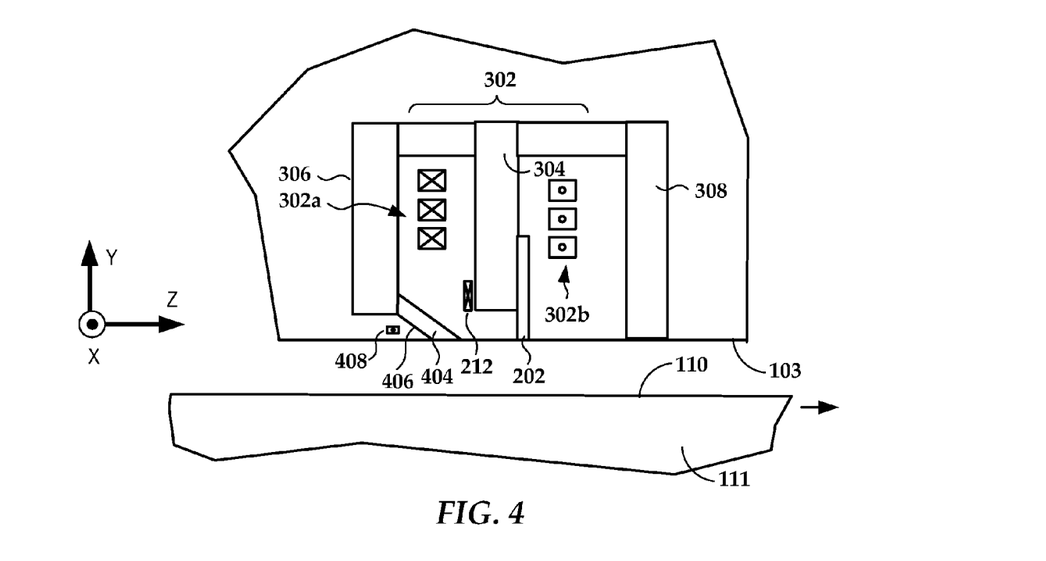

An alternate configuration of a write transponder according to an example embodiment is shown in the cross sectional view of FIG. 4, which corresponds to a view taken along section line 3-3 in FIG. 2. In this view (as well as in FIGS. 5 and 6 that follow), the same reference numbers are used to indicate analogous components as shown in FIGS. 2 and 3. It will be understood that there may be significant variations in geometry, materials, etc. between the analogous components in the different embodiments. In FIG. 4, a front shield 404 has a portion canted at an angle to the media-facing surface 103. A conductive element, e.g., shield wire 408, is located adjacent a surface 406 of the canted portion that faces away from the write pole 202. In this particular case both low recess coil and the wire are both activating front shield magnetization directly in the direction opposite to that of the main pole, producing a very strong, positive combined effect. The balance between the wire and the main coil current in this case strongly impacts the write angle, which can be tuned for substantial performance improvements.

Figure 5:
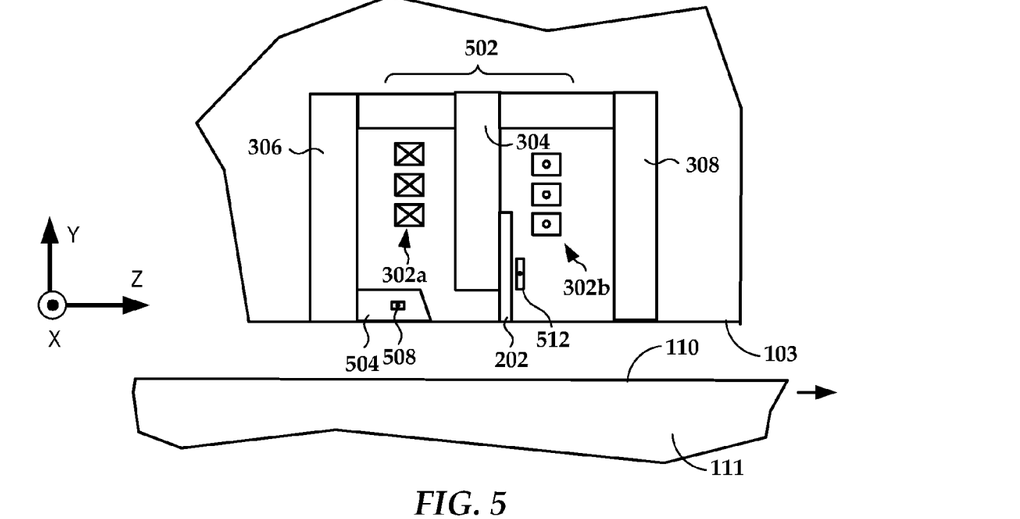
Figure 6:
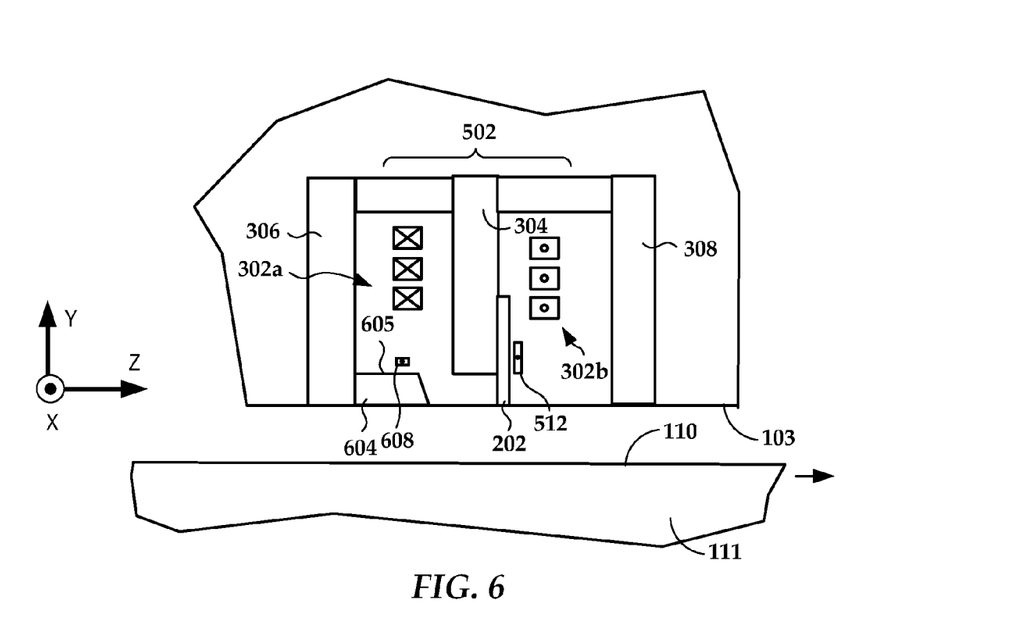

In FIGS. 5 and 6, alternate configurations of a write transponder according to example embodiments are shown in cross sectional views, which generally correspond to a view taken along section line 3-3 in FIG. 2. In FIG. 5, a coil 502 includes first coils 302a, 302b and a low-recess coil wire 512 located near the write pole 202 opposite a front shield 504. In this example, shield wire 508 is embedded in the front shield 504. In the example of FIG. 6, a shield wire 608 is located outside of the front shield 604. The shield wire 604 is adjacent a surface 605 of the shield 604 that faces away from the media-facing surface 103.

The embodiments as shown in FIGS. 5 and 6 were also analytically modeled, and did not show as much improvement in dynamic gradient and rise time as did the previously discussed configurations shown in FIGS. 3 and 4. However, the effect of the low-recess coils 512 on side-track erasure in these configurations is less pronounced than that of low-recess coils 212 in the other configurations. This may be an important consideration in some cases.

In the configuration of FIG. 6, manufacturing complexity is reduced by having the shield wire 608 outside of the shield 604. This may also provide thermo-mechanical benefits. In the embodiments of both FIGS. 5 and 6, the front shields 504, 604 are strongly activated by the wires 508, 608, and this also activates the trailing edge of the writer (e.g., near return pole 308) and side shields (e.g., shields 206 in FIG. 2). The trailing edge and side shield activation is in a direction opposite to that of the leading edge by the low-recess coil 512. The write pole switching in these latter examples is only a little bit slower than in the examples of FIG. 3-4 (as it is still driven by the low-recess coil), but side shield erasure is reduced.

Overall, any of the configurations shown above are capable of improving high data rate performance at moderate currents, while offering a boost to the dynamic gradient. Further, it will be understood that any of these configurations may be used with a trailing shield (not shown) or side shields (see FIG. 2) that utilize a conductor that activates the shields in synchronization with the write pole.

Figure 7:
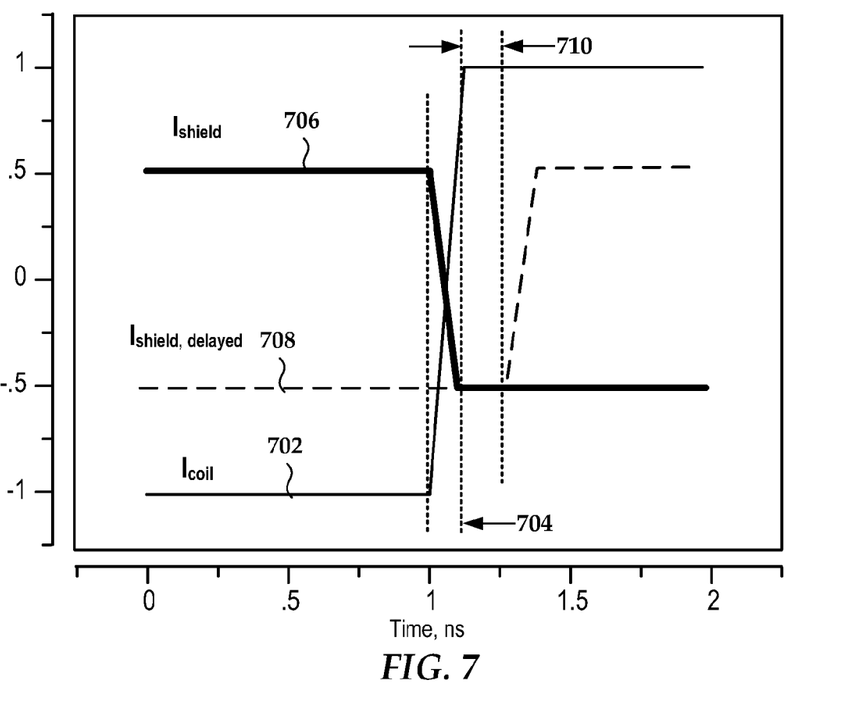
FIG. 7 is a graph illustrating coil and shield energizing currents according to example embodiments.

In reference now to FIG. 7, a graph shows examples of signals that may be used to drive the write pole and shield according to example embodiments. Curve 702 represents an example current signal that drives the coil before, during, and after a switching event that includes a transition period 704. During the transition period 704, the coil current changes polarity, which causes a first magnetic field transition.

Curve 706 represents a current that drives the shield (e.g., front shield) in a non-delayed configuration. The curve 706 transitions between polarities during the transition period 704, causing a second magnetic field transition to occur at the shield. Because the polarity of curve 706 is opposite that of curve 702, the second magnetic field transition is opposite to the first magnetic field transition. Generally, the switching event in this example includes just the transition period 704, allowing for some tolerance within the indicated range due to drift, settling, etc.

As an alternate, the shield wire current may be delayed while being applied with the same polarity current as the main coil, as indicated by curve 708. The delayed curve 708 transitions after the transition period 704. In this case the coil current (and consequently front shield magnetization) is opposite to that of the main coil and the write pole during only a part of the switching event, e.g., when the gradient is established. At other times (e.g., steady-state), the front shield magnetization has the same polarity as that of the main coil, significantly boosting the write field. The switching event in the delayed case includes both the transition period 704 and a short delay period 710 right after the transition where both first and second magnetic fields of the coil and shield are anti-aligned. In this example, the delay period 710 is about 100-250 ps, roughly comparable to the transition period 704.

It appears that large gradient of the write field is mostly important during the early part of the transition period 704, before the write pole reaches the saturation point. At other times, the front shield magnetic field mostly reduces the write field. This suggests the scheme shown by the delayed current curve 708, in which write pole and front shield are switched at different times.

Figure 8:
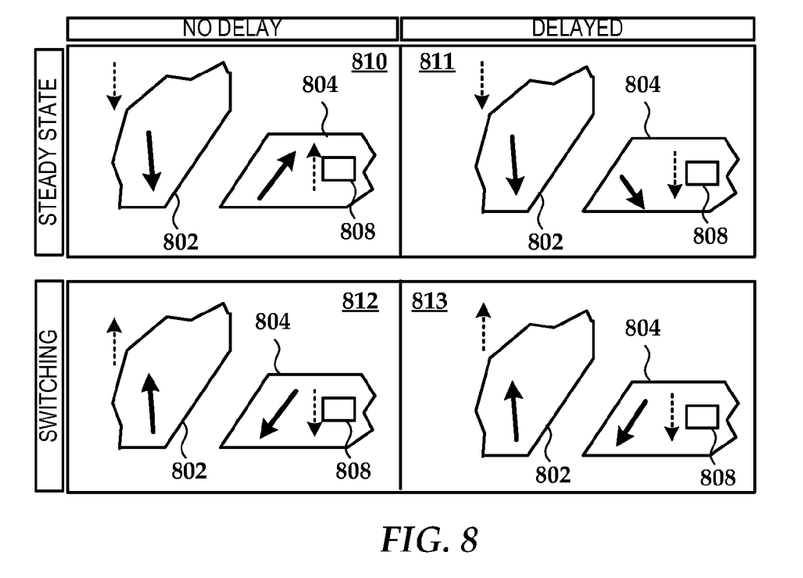
FIG. 8 is a block diagram illustrating magnetic field orientations near the write pole in a delayed and non-delayed configuration according to example embodiments.

In FIG. 8, a block diagram illustrates magnetic field orientations near the write pole in a delayed and non-delayed configuration according to example embodiments. In each of the blocks 810-813, a write pole 802 is shown near shield 804 and shield wire 808. The dashed arrows represent magnetic orientation induced by the respective coil (not shown) and shield wire 808, and the bold arrows represent net fields near the media-facing surface. As seen in blocks 810, 812, the coil and shield magnetic fields in the non-delayed configuration are reversed both at steady-state and during a period when the main coil is switching. The switching period may include a transition period of the coil signal polarity and/or the shield signal polarity, as described in greater detail with respect to FIG. 7.

For the delayed case in block 813, the coil and shield magnetic fields are reversed during switching. This much the same as the non-delayed case shown in block 812. However, for the delayed case at steady-state (as shown in block 811), the front shield 804 is magnetized in the same direction as the write pole 802. This alignment between coil and shield magnetic fields results in a larger write field during steady-state, and also affects the write angle.

Figure 9:
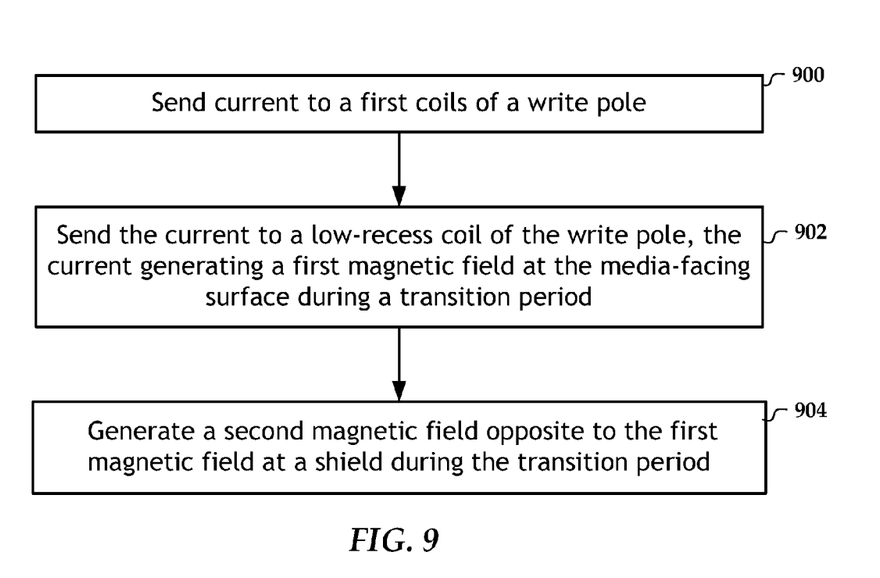
FIGS. 9 and 10 are flowcharts illustrating methods according to example embodiments.

In reference now to FIG. 9, a flowchart illustrates a method according to an example embodiment. A current is sent 900 to first coils of a write pole. The current is also sent 902 to a low-recess coil of the write pole. The low-recess coil is adjacent a shield at a media-facing surface and separate from first coils. The current generates a first magnetic field at the media-facing surface via the coils during a transition period. A second magnetic field opposite to the first magnetic field is generated at a shield during the transition period.

Figure 10:
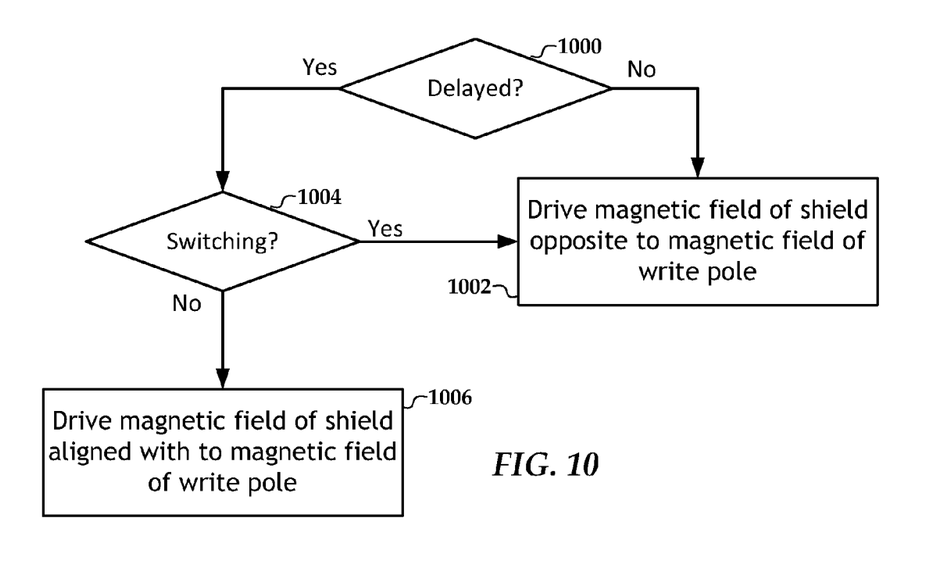

The first and second magnetic fields may be generally opposite during device operation (e.g., non-delayed configuration), or aligned except during the transition period (e.g., delayed configuration). In the latter case, the alignment of the first and second magnetic fields influences a steady-state write angle of the write pole. An apparatus may be configured to utilize either or both of a delayed and non-deleted configuration. For example, the apparatus may include a controller that can be set to either configuration during manufacture, and/or may be able to switch configurations dynamically, e.g., during runtime. An example method of how magnetic fields are driven based on a delayed or non-delayed configuration is shown in the flowchart of FIG. 10.

A determination 1000 is made as to whether a signal is sent to a shield is aligned but delayed from a write coil signal, or opposite the write coil signal. In the latter case, the magnetic field of the shield is driven 1002 in an opposite direction to that of the write pole. In the former, delayed case, the magnetic field of the shield is driven 1002 in an opposite direction to that of the write pole only during switching (or at least part of a switching period/event), as shown by decision block 1004. Otherwise (e.g., during steady-state), the magnetic field of the shield is driven 1006 so as to be aligned with magnetic field of the write pole.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to facilitate managing caching in data storage devices as described above.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
a write pole magnetically coupled to write coils that generate a first magnetic field during a switching event;
a shield at a media-facing surface and proximate the write pole; and
a conductive element disposed proximate the shield and configured to generate a second magnetic field opposite to the first magnetic field during the switching event, wherein a selected one of the write coils is located adjacent the shield separate from others of the write coils.

2. The apparatus of claim 1, wherein a first number of the write coils on the first side of the write pole is different than a second number of the write coils on a second side of the write pole.

3. The apparatus of claim 1, wherein the selected write coil is between the write pole and the shield.

4. The apparatus of claim 3, wherein the shield comprises a canted portion oriented at an angle relative to the media-facing surface, and wherein the conductive element is located adjacent a surface of the canted portion that faces away from the write pole.

5. The apparatus of claim 1, wherein the selected write coil is on a side of the write pole opposite the shield.

6. The apparatus of claim 5, wherein the conductive element is adjacent a surface of the shield that faces away from the media-facing surface.

7. The apparatus of claim 1, wherein the selected write coil comprises an elongated cross section that minimizes coupling between the selected write coil and the conductive element.

8. The apparatus of claim 1, wherein the shield comprises a front shield located in a downtrack direction relative to the write pole.

9. The apparatus of claim 1, wherein the first and second magnetic fields are aligned except during a part of the switching event.

10. The apparatus of claim 9, wherein the alignment of the first and second magnetic fields influences a steady-state write angle of the write pole.

11. The apparatus of claim 1, wherein the selected write coil is 1 µm or less from the media-facing surface.

12. A method comprising:
send a current to first coils of a write pole;
send the current to a low-recess coil of the write pole, the low-recess coil adjacent a shield at a media-facing surface and separate from first coils, the current generating a first magnetic field at the media-facing surface during a switching event; and
generating a second magnetic field opposite to the first magnetic field at the shield during the switching event.

13. The method of claim 12, wherein the first and second magnetic fields are aligned except during part of the switching event period.

14. The method of claim 12, wherein the alignment of the first and second magnetic fields influences a steady-state write angle of the write pole.

15. An apparatus comprising:
a write pole coupled to a main coil to produce a first magnetic field;
a shield in the vicinity of the write pole at an air-bearing surface; and
a wire configured to generate a second magnetic field in the shield in an opposite direction to the first magnetic field.

16. The apparatus of claim 15, wherein the first magnetic field is produced via a first current through the main coil, and wherein a second current through the wire generates the second magnetic field, the first current having a direction opposite that of the second current.

17. The apparatus of claim 16, wherein the second current is relatively smaller than the first current.

18. The apparatus of claim 15, wherein the shield comprises a front shield, and wherein the wire is disposed in a cross track direction.

19. The apparatus of claim 15, wherein the shield comprises a side shield, and wherein the wire is disposed in a down track direction.

20. The apparatus of claim 15, further comprising a control circuit coupled to the main coil and the wire, the control circuit configured to actively synchronize the first and second magnetic fields.

* * * * *